United States Patent [19]
Gundlach

[11] 3,815,249
[45] June 11, 1974

[54] SHADOWLESS SUN DIAL
[75] Inventor: Robert W. Gundlach, Fairport, N.Y.
[73] Assignee: Vencraft Corporation, West Henrietta, N.Y.
[22] Filed: June 8, 1972
[21] Appl. No.: 260,840

[52] U.S. Cl. ................................................ 33/269
[51] Int. Cl. ......................................... G04b 49/00
[58] Field of Search ...................... 33/269, 270, 271

[56] References Cited
UNITED STATES PATENTS
2,207,195   7/1940   Gaudet ............................... 33/270

Primary Examiner—Louis R. Prince
Assistant Examiner—Richard R. Stearns
Attorney, Agent, or Firm—Cumpston, Shaw & Stephens

[57] ABSTRACT

A sundial is formed with a reflecting surface curving in an arc around an axis so that the image of the sun reflected from the surface can be viewed from points along the axis. The surface is mounted with its axis parallel to the axis of the rotation of the earth, and a time scale, also visible from the axis, indicates the time position of the reflected image of the sun.

28 Claims, 12 Drawing Figures

PATENTED JUN 11 1974 3,815,249
SHEET 1 OF 3
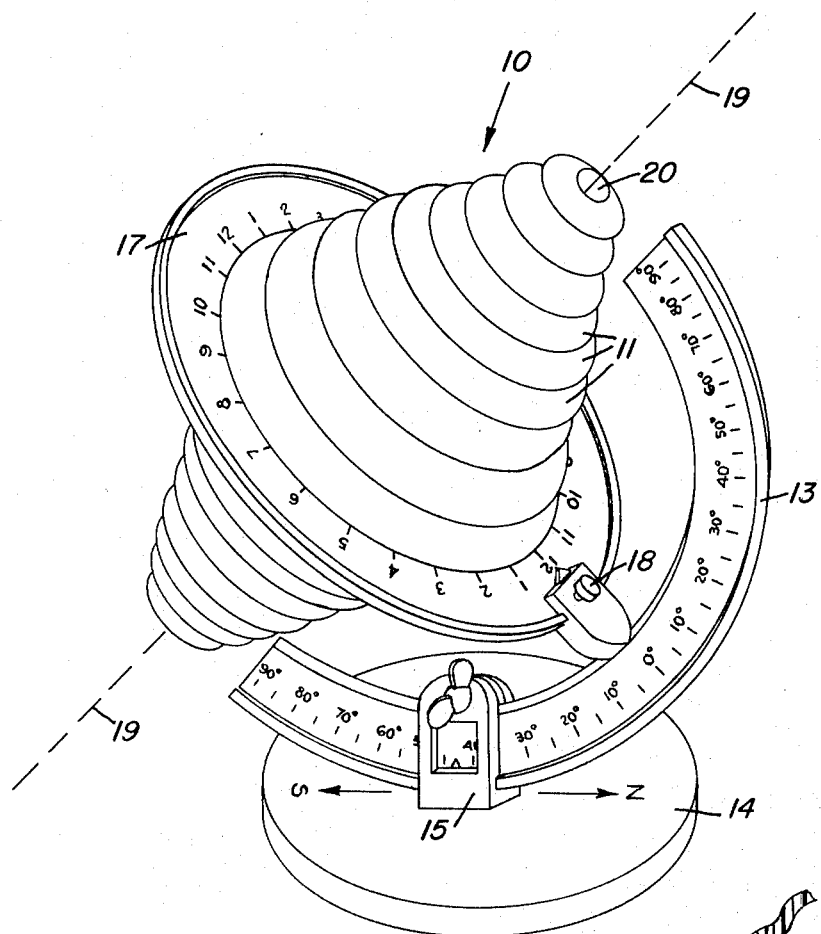
FIG. 1.
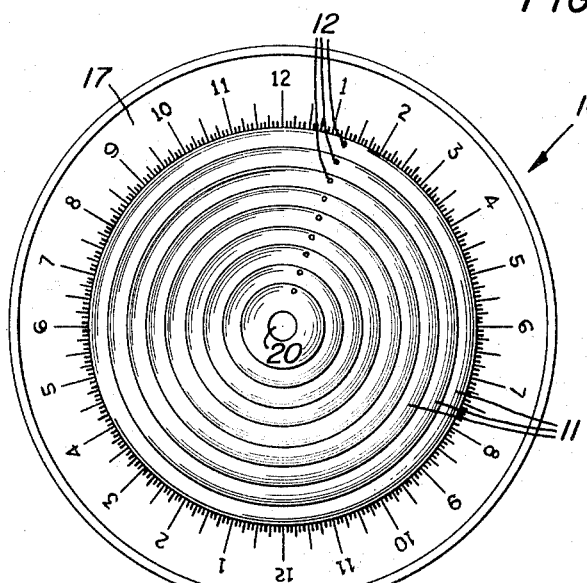
FIG. 2.
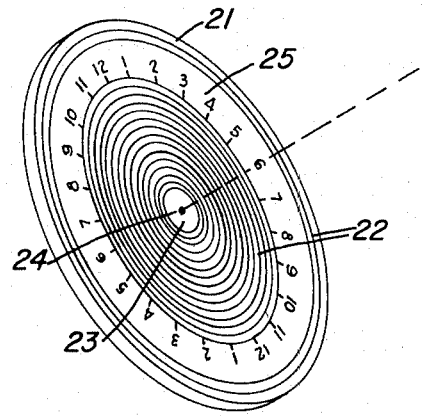
FIG. 1a.
FIG. 3.

SHADOWLESS SUN DIAL

BACKGROUND OF THE INVENTION

Sun clocks or sundials have existed for several thousand years and have normally used a style or gnomen arranged to cast a shadow on a time scale. Such sundials suffer many errors from the eccentricity of the earth's orbit and the inclination of its axis, and they are difficult to adjust to maintain accuracy throughout the year. They are also usable only when the sunlight is bright enough for the gnomen to cast a shadow, and then the shadow width makes the reading ambiguous.

THE INVENTIVE IMPROVEMENT

The invention involves recognition of a way to make a sundial using the reflected image of the sun rather than the shadow of a gnomen. The invention also involves realization of many advantages of a reflecting sundial, including simplicity, easier adjustment, and readability in hazy sunlight. The invention proposes many different arrangements for a reflecting sundial and aims at economy, attractiveness, safety, ease of adjustment, accuracy, reliability and enhanced usefulness.

SUMMARY OF THE INVENTION

The invention shadowless sundial uses a reflecting surface curving in an arc around an axis so that the surface is visible from points along the axis for observing the image of the sun reflected from the surface. The surface is mounted so the axis is approximately parallel to the axis of rotation of the earth, and a time scale, also visible from points along the axis, is arranged for indicating the time position of the reflective image of the sun as viewed from the axis.

DRAWINGS:

FIG. 1 is an isometric view of a cone-shaped sundial according to the invention;

FIG. 1a is a partial cross-sectional view of the sundial of FIG. 1 taken along the line 1a – 1a;

FIG. 2 is a fragmentary, on-axis view of the sundial of FIG. 1;

FIG. 3 is an isometric view of a disk-shaped sundial according to the invention;

Figure 4:
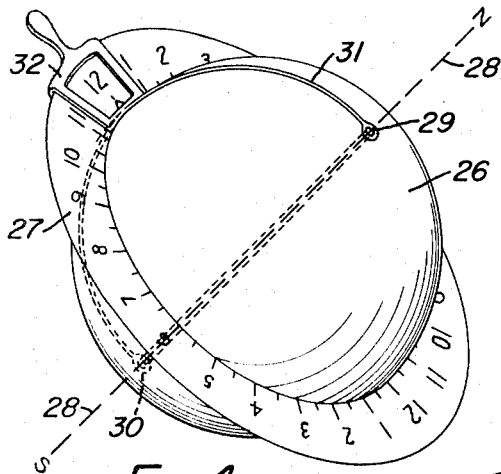
FIG. 4 is an isometric view of a spherical sundial according to the invention.

DETAILED DESCRIPTION:

The drawings illustrate several embodiments of the inventive sundial and show several of the many forms it can take. Generally, each of the illustrated sun clocks or sundials has a reflecting surface shaped to reflect an image of the sun and oriented and associated with a time scale for indicating the time position of the reflected image. The reflecting surface is sufficiently glossy or specular to reflect an image or highlight of the sun and can be made of glass, metal, plastic, or other material. The reflecting surface curves in an arc around an axis and is preferably formed as a surface of revolution around the axis. A surface of revolution is preferred for simplicity and adjustability, but other surfaces can be used within the spirit of the invention.

A mount for the inventive sundial generally includes a base that can be leveled and set in a plane parallel with the earth's axis and an adjustable latitude ring for setting the sundial axis to the latitude of its location to be parallel to the earth's axis.

The inventive sundial also preferably includes means for indicating on-axis viewing so that the viewer knows he is observing the sundial from a point on its axis to insure an accurate reading. A time scale is preferably visible from an on-axis viewing position to indicate the time position of the sun's reflection, and the scale is preferably rotational relative to the sundial axis for correcting the sundial for longitude, for daylight saving time, and for variations due to the eccentricity of the earth's orbit around the sun.

The sundial 10 of FIGS. 1 and 2 has a pair of generally conical reflecting surfaces made up of glossy rings or tores 11 each of which reflects the sun's image or highlight 12 as shown in FIG. 2. The position of images 12 depends on the relative orientation of the sun, the sundial and the viewer.

Sundial 10 is supported on a latitude ring 13 which in turn is supported on a mounting base 14. For accuracy, axis 19 of sundial 10 should be parallel with the earth's rotational axis, and this is accomplished by positioning base 14 horizontally so that latitude ring 13 lies in a north-south vertical plane and then adjusting latitude ring 13 so that indicator 15 points to the exact latitude of the sundial. Such adjustment is maintained by wing nut 16. For example, Rochester, New York, is at 43° N latitude, and latitude ring 13 is set for 43° as shown in FIG. 1.

A time scale 17 surrounds the conical reflecting surfaces, and scale 17 is preferably rotationally adjustable to the correct longitude of the sundial, the equation of time, and perhaps for daylight saving time. These adjustments are made through thumb screw 18 coupling scale 17 to latitude ring 13.

To read the correct time, sundial 10 is viewed anywhere along the axis 19 of cone rings 11. This is established for the viewer by a hollow core or hole 20 extending through sundial 10 on the axis of rings 11. When the eye is positioned to see through hole 20, it can also see the sun's reflected images 12 lying in a straight line intercepting time scale 17 at the correct time reading as shown in FIG. 2. Sundial 10 can be mounted above eye level and read by looking upward from a southerly point on axis 19, and the underside of time scale 17 has hour numbers increasing in a counterclockwise direction for such reading. FIG. 2 shows the appearance of sundial 10 as viewed from the north side downward along axis 19.

From the earth, the sun subtends an angle of ½° so that the reflected highlights or images 12 each extend over ½° along each ring 11. Since each hour is separated by 15°, the one-half degree highlight spans onethirtieth of an hour or 2 minutes on time scale 17. Therefore, it is possible to read the time from the correctly positioned dial within one minute of the exact civil time.

FIG. 3 shows a disk-shaped form of the invention having an upper surface 21 that is scored or corrugated with concentric rings 22. The center of the disk has a smooth mirror 23 with a small dot 24 on the axis of the disk. The observer positions one eye so that its mirror image is centered on dot 24 to establish that the observing eye is on the axis of the disk. From such position, the observer reads the time with the same eye by viewing the line of highlights or images reflected from rings 22 and the intercept of such line with time scale 25 which is preferably rotatably adjustable around the axis of the disk to give the correct time.

If the disk is generally flat, it can be read from the north side in the northern hemisphere only between March and September equinoxes and must be read from the south side during the other half of the year. To correct for this, rings 22 preferably form convex surfaces so that sun reflections are visible on both sides of the disk.

The disk embodiment of FIG. 3 can also be made convex enough to be viewed from the same side year around. To accomplish this, the envelope of rings 22 must be angled at least 23 ½° from the central plane of the sundial.

FIG. 4 shows a spherical, specular reflective surface 26 having a time scale 27 encircling its equator so that time scale 27 is perpendicular to the north-south axis 28 of sphere 26. Attached to the poles 29 and 30 is a thin, curved rod 31 carrying a pointer 32 that slides along scale 27. Rod 31 is positioned to obscure the image of the sun reflected from sphere 26 along axis 28 so that pointer 32 indicates the time position of the image, with time scale 27 adjustable around axis 28. The observer locates his eye on axis 28 by viewing south pole piece 30 through the opening in north pole piece 29.

Figure 5:
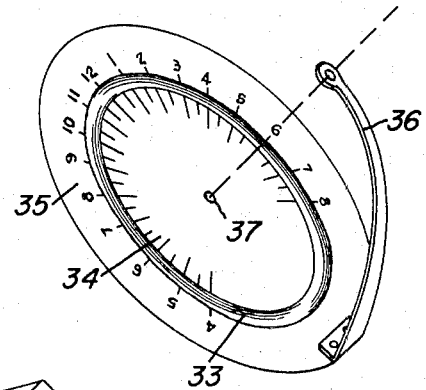
FIG. 5 is an isometric view of another preferred embodiment of the inventive sundial with a toroid reflecting surface.
Figure 6:
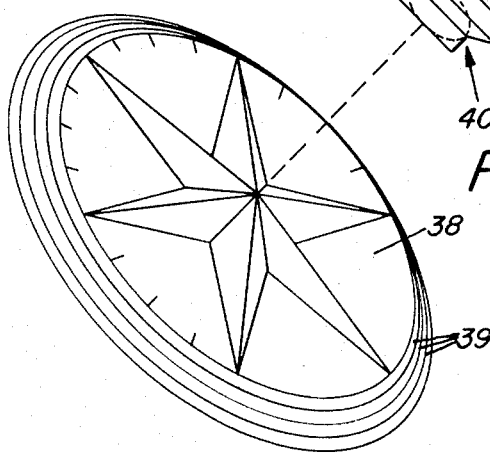
FIG. 6 is an enlarged fragment of a preferred form of scale for use with the sundial of FIG. 5.

The sundial of FIGS. 5 and 6 has a single, specularly reflective annular ring 33 straddled by an inner time scale 34 and outer time scale 35. One-quarter hour markings on scale 34 provide casual reading, and a more precise reading can be made from the one-minute intervals on scale 35. The axial viewing position is established by aligning a sight ring 36 and a hole or mark 37.

Figure 7:
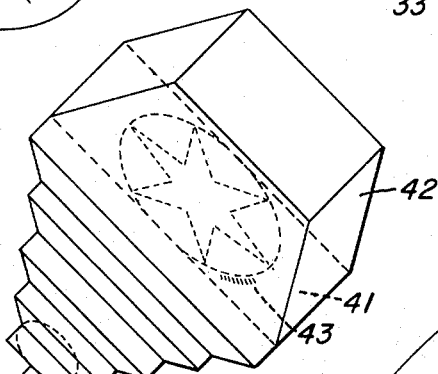
FIG. 7 is an isometric view of another preferred embodiment of the inventive sundial.

The sun dial 38 of FIG. 7 has peripheral reflecting rings 39 in a conical or convex form, and an optical system 40 projects an image of sundial 38 on viewing screen 41. Optical system 40 is positioned on the north-south axis of sundial 38, and viewing screen 41 is frosted glass or some other known, backlighted projection screen. A light shield 42 shields screen 41 from the viewing side, and a time scale 43 is preferably formed on viewing screen 41 instead of sundial 38. This is especially desirable if sundial 38 is massive so that time correction adjustments can be made more easily with a more readily movable scale 43 on viewing screen 41. Also, a video camera or other viewing device can view sundial 38 relative to a time scale.

Figure 8:
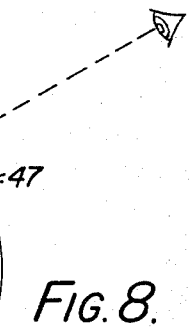
FIG. 8 is an isometric view of another preferred embodiment of the inventive sundial using a Fresnel lens.

The sundial of FIG. 8 uses a Fresnel lens 44 having its optic axis parallel to the north-south axis of the earth. A time scale 45 is located in a plane parallel to the plane of lens 44 and centered on the axis of lens 44 but spaced away by slightly less than the focal length of lens 44. Then the observer's eye can center scale 45 with lens 44 to ensure on-axis viewing, and the concentric rings 46 of Fresnel lens 44 form a line of reflective or diffractive highlights 47 intercepting scale 45 to indicate the correct time if scale 45 is properly adjusted rotationally of the axis of lens 44.

Figure 9:
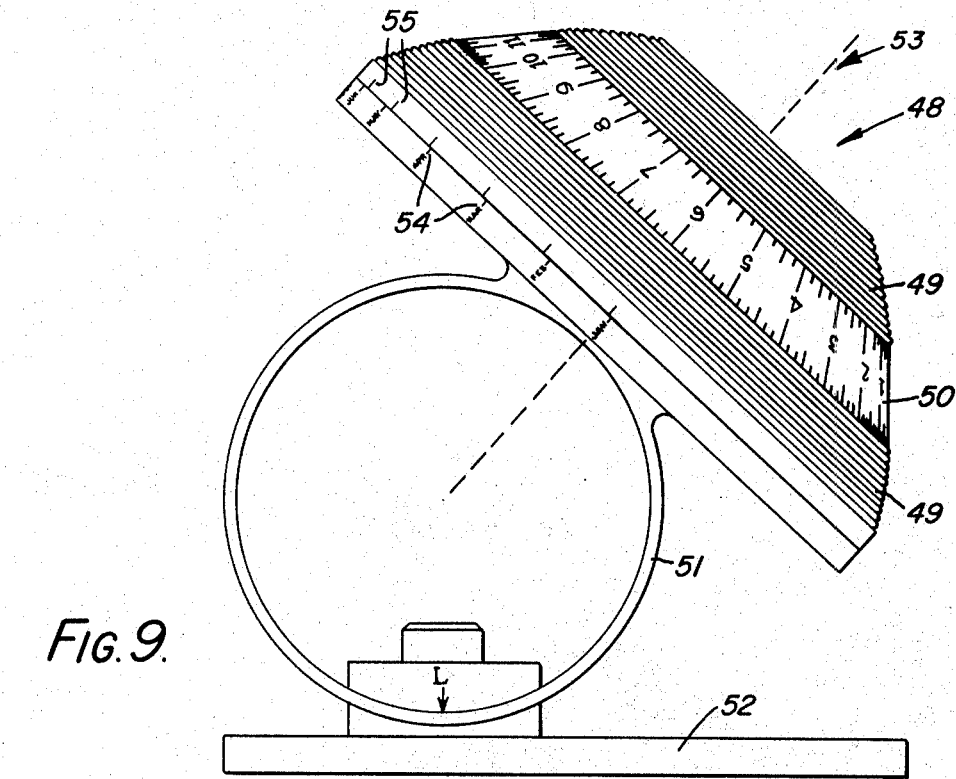
FIGS. 9 and 10 are elevational views of other preferred embodiments of the inventive sundial.

The sundial 48 of FIG. 9 has a reflecting surface formed from one continuous strand 49 wound in convolutions in a generally spherical shape as illustrated to straddle a time scale 50. Latitude ring 51 supports sundial 48 on a base 52 for adjusting axis 53 parallel to the earth's axis as previously described. A fixed set of adjustment markers 54 is supported by latitude ring 51 and identified with the months of the year as shown. Another set of markers 55 rotatably movable with dial 50 are selectively matched in coincidence with markers 54 for correcting sundial 48 for each month of the year. The markers 55 are positioned exactly 15° apart so that one of them can be matched with a current month marker 54 to set sundial 48 to correct standard time, and an adjacent marker 55 matched with the same month marker sets sundial 48 for daylight saving time.

Figure 10:
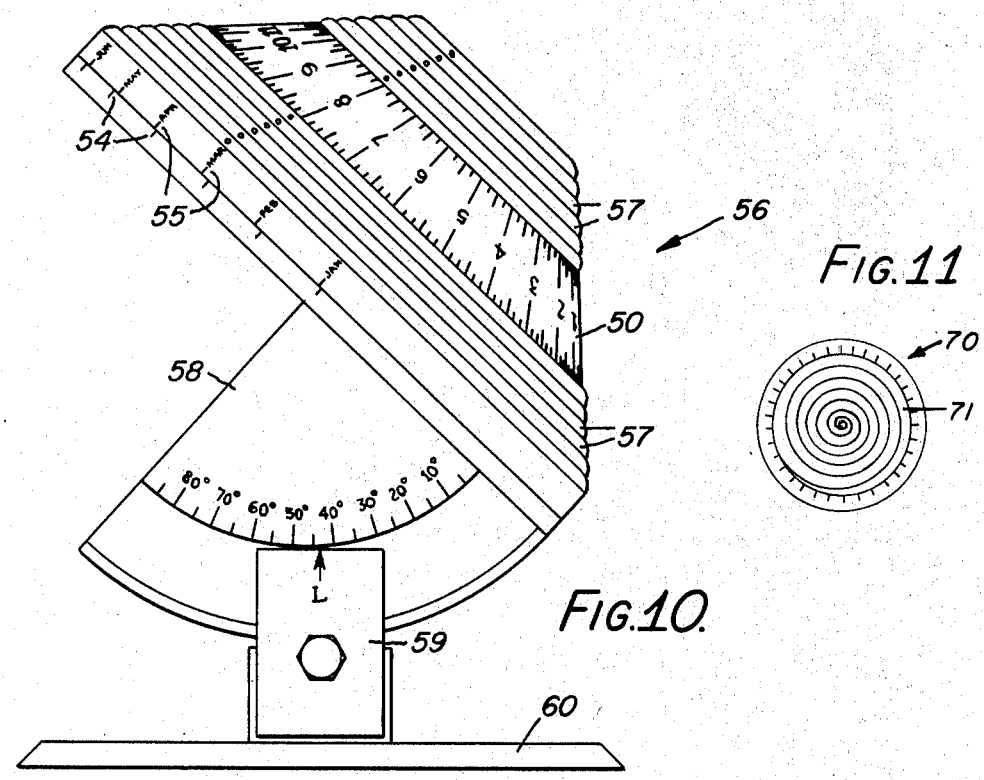

Sundial 56 of FIG. 10 is similar to sundial 48 and has a conical reflective surface 57 straddling a time scale 50. As shown, the month indication for markers 54 and 55 can be interchanged, with markers 54 being equally spaced at 15° intervals, and sundial 56 has a different latitude ring 58 held in place by an adjustment clamp 59 on base 60. Sundials 48 or 56 preferably have one of the previously described on-axis sighting means such as an axial reflective mirror, a bore hole sight, or other sight.

Figure 11:
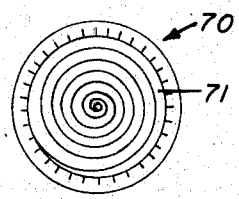
FIG. 11 is a plan view of a sundial similar to the sundial of FIG. 2 but having a helical ring.

FIG. 11 shows a sundial 70 having a reflective surface 71 wound in a spiral or helical form from a single strand of reflective material. Sundial 70 is similar to the sundials of FIGS. 2 or 3 except for the spiral or helical winding which can be applied to many of the other embodiments of the invention.

The various embodiments of the inventive sundial as shown and described above, make it clear that many shapes and designs can be made within the spirit of the invention. A great variety of decorative and attractive sundials using the inventive concepts can be made for garden, architectural and other uses. These are easily adjusted for precise, accurate and unambiguous readings, they are readily made safe, without sharp projections, durable and attractive, and they are capable of indicating time in sunlight that is too hazy to cast a discernible shadow.

Persons wishing to practice the invention should remember that other embodiments and variations can be adapted to particular circumstances. Even though one point of view is necessarily chosen in describing and defining the invention, this should not inhibit broader or related embodiments going beyond the semantic orientation of this application but falling within the spirit of the invention. For example, those skilled in the art will understand the many materials, shapes, configurations, mounting and adjusting devices, and sighting or viewing means possible within the spirit of the invention.

I claim:

1. A shadowless sundial comprising:
   a. means for defining an axis and, connected in a fixed relationship thereto, a body having a reflecting surface forming at least a segment of a substantially annular surface generally transverse to said axis and whose center of curvature lies on said axis;

b. mounting means connected to said body for maintaining said axis approximately parallel to the axis of rotation of the earth; and c. time scale means carried by said body for indicating the time position of the reflected image of the sun formed on said reflecting surface as viewed from a point on said axis.

2. The sundial of claim 1 wherein said means defining an axis comprises sight means arranged for indicating on-axis viewing of said sundial.

3. The sundial of claim 2 wherein said sight means comprises a mirror perpendicular to said axis for reflecting an image of the viewer's eye.

4. The sundial of claim 2 wherein said sight means includes an axial hole.

5. The sundial of claim 2 wherein said sight means comprises a pair of spaced sight pieces arranged on said axis.

6. The sundial of claim 1 including apparatus arranged on said axis for making said reflected image of said sun visible to a viewer.

7. The sundial of claim 1 wherein said reflecting surface is formed as rings of different radii generally perpendicular to said axis.

8. The sundial of claim 7 wherein said rings are in a generally conical form.

9. The sundial of claim 7 wherein said rings are arranged next to each other in the general form of a disk.

10. The sundial of claim 9 wherein said disk formed by said rings is convex.

11. The sundial of claim 7 wherein said rings are formed as a Fresnel lens.

12. The sundial of claim 1 wherein said reflecting surface comprises a length of narrow reflective material wound around said axis at continually increasing radii forming a closely wound spiral.

13. The sundial of claim 12 wherein said reflective material is wound in a generally conical form.

14. The sundial of claim 12 where said reflective material is wound in a convex spherical form.

15. The sundial of claim 1 wherein said scale means is circular and includes means mounting a circular time scale for rotational movement about said axis.

16. The sundial of claim 15 including fixed and rotatable sets of adjustment markers on said time scale and said body, respectively arranged to be selectively matched in coincidence to compensate for the earth's equation of time.

17. The sundial of claim 16 wherein one of said sets of said markers represents the months of the year.

18. The sundial of claim 16 wherein one of said sets of said markers is spaced uniformly at 15° intervals.

19. The sundial of claim 18 wherein the other one of said sets of said markers represents the months of the year.

20. The sundial of claim 1 wherein said reflecting surface is a specularly reflecting surface of revolution around said axis.

21. The sundial of claim 20 wherein said reflecting surface is generally conical.

22. The sundial of claim 20 wherein said reflecting surface is generally spherical.

23. The sundial of claim 20 wherein said reflecting surface is generally convex.

24. The sundial of claim 20 wherein said reflecting surface is formed as rings of different radii.

25. The sundial of claim 20 wherein said scale means is circular and has hourly divisions spaced at equal intervals of 15°.

26. The sundial of claim 25 wherein said scale means is circular and includes means mounting a circular time scale for rotational movement about said axis.

27. The sundial of claim 26 including fixed and rotatable sets of adjustment markers on said time scale and said body, respectively arranged to be selectively matched in coincidence to compensate for the earth's equation of time, and one of said sets represents the months of the year.

28. The sundial of claim 27 wherein one of said sets of said markers is spaced uniformly at 15° intervals and the other one of said sets of said markers represents the months of the year.

* * * * *